United States Patent Office 3,062,639
Patented Nov. 6, 1962

3,062,639
TREATMENT OF IRON-CONTAINING MATERIALS
Edwin Sterling, Murray Hill, N.J., assignor to The M. W. Kellogg Company, Jersey City, N.J., a corporation of Delaware
No Drawing. Filed July 21, 1959, Ser. No. 828,454
8 Claims. (Cl. 75—26)

This invention relates to the treatment of iron-containing materials and, more particularly, to the treatment of iron-ores. Still more particularly, the invention relates, in one of its aspects, to the pretreatment of iron-ore and subsequent reduction thereof under conditions in which the pretreated material is suspended in a reducing gas during the reduction treatment.

In the direct reduction of iron-containing materials, and particularly in the reduction of iron-ores such as native hematite, including Venezuelan ores, magnetites, including taconite ores, or other materials such as jasper and minettes, etc., it has been found that when the reduction is carried out under fluidized conditions in which the iron-containing particles are suspended in an upflowing reducing gas in the reduction zone, the reduction of the iron-ore is hampered by the agglomeration and subsequent slumping of the partly reduced iron-ore particles. This agglomeration occurs at a result of the iron particles tending to adhere or stick by surface-to-surface contact at the relatively high temperatures encountered during the reduction treatment, with a subsequent clustering or slumping condition, resulting in the formation of large masses of iron particles, which cannot be effectively reduced, particularly where fluidized techniques are employed. This deleterious condition is particularly noticeable where the product of the reduction of the iron-containing material undergoing treatment comprises sponge iron, and in which the iron particles are suspended, under fluidized conditions, in an upwardly flowing reducing gas, such as hydrogen or mixtures of hydrogen and carbon monoxide. Under these conditions, the aforementioned agglomeration and slumping results in a loss of the fluidization characteristics of the iron particles, and efficient and economical reduction is not attained.

It is, therefore, an object of this invention to obviate the aforementioned difficulties accompanying the reduction of iron-containing materials.

Another object of the invention is to provide an improved method for preventing the agglomeration and slumping of iron-containing materials so that they may lend themselves to efficient reduction treatment.

Still another object of the invention is to provide an improved process for preventing the agglomeration and slumping of iron-ore particles during a reduction treatment under fluidized conditions.

A further object of the invention is to provide an improved process for carrying out efficient and economical reduction of a reducible iron-containing material under fluidized reduction conditions.

Other objects and advantages inherent in the invention will become apparent to those skilled in the art from the accompanying description and disclosure.

According to the present invention, the particulate or pulverulent iron-containing material, or iron-ore, is subjected to a pretreatment operation to deposit a film or coating around the iron particles, under the conditions more fully hereinafter described and, following such pretreatment, the coated particles are thereafter subjected to direct reduction treatment under fluidized conditions, or to conditions in which the coated particles are suspended in a reducing gas in the reduction zone. As a result of such pretreatment, it has been found that agglomeration and subsequent slumping of the iron particles is substantially avoided, resulting in substantially complete reduction of the iron-containing material, under the reduction conditions, in an efficient and economical manner. Thus, it will be seen that the process of the present invention has various applications to those situations where it is desired to maintain finely divided iron-containing materials in a fluidized state at temperatures under which it would, ordinarily, be difficult, if not impossible, to maintain such materials in a fluidized state, by reason of the aforementioned agglomeration and slumping normally encountered under such conditions.

Specifically, the above-mentioned pretreatment of the iron-containing materials is carried out by depositing a film or coating, comprising a metal-containing compound, around the iron particles. These metal-containing compounds may comprise such compounds as magnesium nitrate, magnesium chloride, magnesium phosphate, magnesium carbonate, magnesium sulfate or calcium nitrate, calcium chloride, calcium phosphate, calcium carbonate and calcium sulfate; chromium nitrate; ammonium vanadate, $NH_4VO_3$; ammonium paratungstate, $(NH_4)_6W_7O_{24}$; or sodium chloride; or combinations of any of the above compounds. In this respect, it should also be noted that the reference to the use of metal-containing compounds as coating agents is also intended to include such compounds of metalloids as boron, silicon, antimony and bismuth. It will also be noted that the above preferred compounds are those leading to the metal oxide under the thermal, hydrolyzing and reducing conditions that prevail in the processes for the direct reduction of iron-ores.

In carrying out the pre-coating treatment, the specific metal-containing compound, or mixtures thereof, is employed in the form of a solution in which the specific compound is present in an amount of at least 0.01 percent by weight, and may also be present in such quantities that the saturation point of the solution is reached. In preferred applications, solutions are employed which contain between about 0.5 and about 10 percent by weight of the metal-containing compounds. The solution which is employed as a vehicle or distributing medium for the metal-containing compounds, in general, may comprise any medium which has an affinity for the metal-containing compound, or mixtures of such compounds, and preferably comprises water, ketones, e.g., acetone; alcohols, e.g., methanol; or mixtures of any of the above, or other aqueous solutions of the above or mixtures of such aqueous solutions.

In depositing the film or coating of the metal-containing compound around the iron-containing particles, the preferred treatment comprises soaking the iron-containing material, e.g., in the form of iron-ore particles, in a previously prepared solution of the metal-containing compound, as described above. The deposition of the coating begins instantaneously upon contact. To insure an adequate and complete coating, it is desirable to add such amounts of the aforementioned solution as will result in a complete soaking and wetting of the iron particles to the extent that the presence of a supernatant liquid is observed. This supernatant liquid is next removed by such methods as decantation, evaporation, filtration or centrifuging. It should be noted, that if so desired, the iron-containing material may first be crushed or otherwise reduced to such particle size as is normally employed in fluidized operations.

In order to carry out the subsequent reduction treatment of the coated material in as an efficient and economical manner as possible, it is preferably desirable to preheat the soaked material at such temperatures as will drive off the solvent without effecting the actual reduction of the iron-containing material itself. Thus, for example, where water is employed as the solvent or vehicle for the metal-containing compound, the pretreatment coating operation is preferably followed by heating the soaked material (after the supernatant or excess liquid has been removed, as indicated above) at temperatures below the boiling point of water, e.g., between about 90° C. and 98° C., for a sufficient period of time until the coated iron particles are obtained in a relatively dry state. It is in this condition that the dried coated particles are subjected to the subsequent reduction treatment. The subsequent reduction treatment of the dried, coated iron particles is generally carried out at temperatures between about 500° C. and below the melting point of iron (viz., 1535° C.). Preferably the reduction treatment of the iron-ore particles is carried out at temperatures between about 550° C. and about 1000° C. for the most efficient operation. By carrying out the procedure indicated above, no agglomeration or slumping of the iron-containing particles during the reduction operation, is observed.

The following examples are offered for a better understanding of the process of the present invention, and are not to be construed as limiting its scope. In these examples, aqueous solutions of the respective metal-containing compounds were prepared in a 1000 ml. volumetric flask fitted with a glass stopper. Batches of 80 grams of dry iron-ore, 100–325 mesh were then poured successively into the 1000 ml. beaker at the same time as 80 ml. increments of the aqueous solution were added thereto. The resulting mixture was then stirred for approximately 10 seconds before the next 80 gram batches of iron-ore and solution were added. After the iron ore particles had settled in the beaker, the supernatant froth was removed with the aid of filter paper. The top of the beaker was then covered, almost entirely, with a watch glass and heated at temperatures maintained between about 90 to 98° C. for 15 hours in an air circulating oven. At the end of this time, after cooling, the product was then placed in a closed bottle, preparatory to the subsequent fluidized reduction treatment.

*Example I*

In accordance with the aforementioned procedure, 400 grams of Venezuelan ore, viz., a hematite ore ($Fe_2O_3$), and containing 63% total iron were contacted with 400 ml., 0.1 molar aqueous solution of $CaCl_2$. After the iron-ore particles had been completely soaked, the following concentration of calcium/iron, was calculated:

$$\frac{0.04 \text{ mole Ca}}{2.5 \text{ moles } Fe_2O_3} \text{ viz. } \frac{0.04 \text{ Ca}}{5 \text{ moles Fe}}$$

$$\frac{0.04 \times 40 \times 100}{5 \times 63/69.9 \times 55.85} = 0.63\% \text{Ca/Fe}$$

$$\frac{0.4 \times 111.0 \times 100}{2.5 \times 63/69.9 \times 157.7} = 1.23\% CaCl_2/\text{Venezuelan ore}$$

The reduction of the above-described and dried iron-ore particles was carried out under fluidization conditions, in the form of a fluidized bed, 5 inches in height, in a tube having a diameter of 1.8 inches. Hydrogen was employed as the reducing gas with a velocity of 1.2 ft./sec. The fluidized reduction treatment was carried out at a temperature of 870° C. and was maintained under these conditions for a period of 5 hours. After this time, it was found that reduction of the iron-ore had been attained to the extent of more than 95%. A control test, similarly conducted with the uncoated iron-ore particles, resulted in allowing the reduction to take place to the extent of only 40–50%. In this respect, it was observed that after carrying out the reduction under the fluidization conditions, an agglomeration and slumping of the fluidized bed was obtained after a period of only 30 minutes. Further operation under conditions of fluidization could not be carried on.

*Example II*

In accordance with the procedure indicated in Example I above, 400 grams of Venezuelan ore, viz., a hematite ore ($Fe_2O_3$) and containing 63% total iron, were pretreated with a 0.1 molar aqueous solution of magnesium nitrate. It was found that this resulted in yielding a deposit of about 1% magnesium nitrate upon the surface of the iron-ore particles. The above concentration of magnesium/iron, was calculated, in this respect, as follows:

$$\frac{0.04 \text{ mole Mg}}{2.5 \text{ moles } Fe_2O_3} \text{ viz. } \frac{0.04 \text{ mole Mg}}{5 \text{ moles Fe}}$$

$$\frac{0.04 \times 24.3 \times 100}{5 \times 63/69.9 \times 55.85} = 0.39\% \text{Mg/Fe}$$

$$\frac{0.04 \times 256.43 \times 100}{2.5 \times 63/69.9 \times 159.7} = 2.85\% Mg(NO_3)6H_2O/\text{Venezuelan ore}$$

As in Example I, the reduction of the above-described and dried iron-ore particles was carried out under fluidization conditions, in the form of a fluidized bed, 5 inches in height, in a tube having a diameter of 1.8 inches. Hydrogen was employed as the reducing gas with a velocity of 1.2 ft./sec. The fluidized reduction treatment was carried out at a temperature of 870° C. and was maintained under these conditions for a period of 5 hours. After this time, it was found that reduction of the iron-ore had been attained to the extent of more than 95%. A control test, similarly conducted with the uncoated iron-ore particles, resulted in allowing the reduction to the extent of only 40–50%. In this respect, it was observed that after carrying out the reduction under the fluidization conditions, an agglomeration and slumping of the fluidized bed was obtained after a period of only 30 minutes. Further operation under conditions of fluidization could not be carried on.

In a manner similar to the procedure described in the above examples, the other compounds recited above, viz., magnesium chloride, magnesium phosphate, magnesium carbonate, magnesium sulfate, calcium nitrate, calcium phosphate, calcium carbonate or calcium sulfate or compounds of the aforementioned metalloids are employed in the form of a solution, e.g., aqueous solutions, to form a coating around the iron-containing particles. Thereafter such coated particles are subjected to the reduction treatment under fluidization conditions, as described above, to result in the reduction of the iron-ore particles without agglomeration and slumping taking place.

While a particular embodiment of the process of the present invention has been described for the purpose of illustration, it should be understood that various modifications and adaptations thereof which will be obvious to those skilled in the art may be made without departing from the spirit of the invention.

I claim:

1. A process for treating a reducible iron oxide which comprises contacting said oxide with at least one solution of a material comprising an element selected from the group consisting of an alkali metal, an alkaline earth metal, a metal of group V, a metal of group VIB, boron, and silicon to deposit a substantially complete coating of said material thereon sufficient to prevent agglomeration and of sufficient porosity to permit reduction to take place separately, drying said thus-deposited coating, separately passing a reducing gas through said treated iron oxide in a reduction zone under fluidized conditions to suspend said treated iron oxide in said reducing gas, and maintaining a temperature in said reduction zone between about 500° C. and about 1535° C. such that said iron oxide is substantially reduced.

2. The process of claim 1 in which said solution comprises magnesium nitrate.

3. The process of claim 1 in which said solution comprises magnesium chloride.

4. The process of claim 1 in which said solution comprises magnesium phosphate.

5. The process of claim 1 in which said solution comprises magnesium carbonate.

6. The process of claim 1 in which said solution comprises calcium chloride.

7. The process of claim 1 in which said solution contains at least 0.01 percent by weight of the material comprising an element selected from the group consisting of an alkali metal, an alkaline earth metal, a metal of group V, a metal of group VIB, boron and silicon.

8. The process of claim 1 in which the temperature maintained in the reduction zone is between about 550° C. and about 1000° C.

References Cited in the file of this patent

UNITED STATES PATENTS

| | | |
|---|---|---|
| 1,730,738 | Levermore | Oct. 8, 1929 |
| 2,254,976 | Powell | Sept. 2, 1941 |
| 2,444,916 | Cape et al. | July 13, 1948 |
| 2,757,078 | Edstrom | July 31, 1956 |
| 2,758,021 | Drapeau et al. | Aug. 7, 1956 |

UNITED STATES PATENT OFFICE
CERTIFICATE OF CORRECTION

Patent No. 3,062,639                          November 6, 1962

Edwin Sterling

It is hereby certified that error appears in the above numbered patent requiring correction and that the said Letters Patent should read as corrected below.

Column 3, line 49, for "0 04 mole Ca" read -- 0.04 mole Ca --; line 57, for "2.5×63/69.9×157.7" read -- 2.5×63/69.9×159.7 --; column 6, line 12, for "Drapeau et al." read -- Drapeau, Jr. et al. --.

Signed and sealed this 22nd day of October 1963.

(SEAL)
Attest:

ERNEST W. SWIDER
Attesting Officer

EDWIN L. REYNOLDS
Acting Commissioner of Patents